A. W. WHITE & J. J. WATSON.

Chin-Rests for Violins.

No. 6,193. Reissued Dec. 22, 1874.

Witnesses
B. W. Mecum
E. H. Ober

Asa W. White
John J. Watson
Inventors
By their Attys
Henry W. Williams & Co

THE GRAPHIC CO. PHOTO-LITH. 39 & 41 PARK PLACE, N.Y.

UNITED STATES PATENT OFFICE.

ASA W. WHITE, OF BOSTON, MASSACHUSETTS, AND JOHN J. WATSON, OF NEW YORK, N. Y., ASSIGNORS, BY MESNE ASSIGNMENTS, OF PART INTEREST TO WILLIAM M. BYRNES, OF BOSTON, AND EMMONS HAMLIN, OF WINCHESTER, MASSACHUSETTS.

IMPROVEMENT IN CHIN-RESTS FOR VIOLINS.

Specification forming part of Letters Patent No. 96,174, dated October 26, 1869; reissue No. 6,193, dated December 22, 1874; application filed November 20, 1874.

*To all whom it may concern:*

Be it known that we, ASA W. WHITE, of Boston, in the county of Suffolk and State of Massachusetts, and JOHN J. WATSON, of New York, in the county and State of New York, formerly of Gloucester, county of Essex, Massachusetts, have invented a new and Improved Chin-Rest for the Violin and Viola; and we do hereby declare that the following is a full, clear, and exact description thereof, reference being had to the accompanying drawings, and to the letters of reference marked thereon.

The nature of our invention consists of the arrangement for fastening and tightening a chin-rest to the violin and viola.

Figure 1:
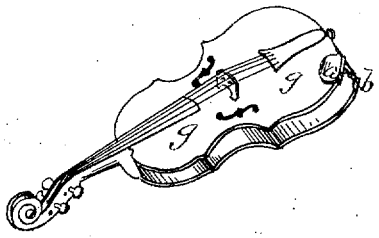
Figure 2:
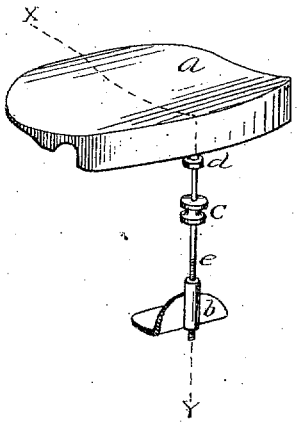
Figure 3:
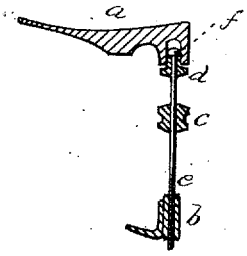

In the accompanying illustration, Figure 1 represents a violin with our device attached. Fig. 2 is a view in perspective of the said invention. Fig. 3 is a vertical section of the same cut through the line *x y*.

Similar letters of reference indicate corresponding parts.

*a* is that portion of the rest upon which the chin of the performer is placed, and lies upon the upper side of the violin. *b* is that portion pressing against the lower side of the instrument. *c* is a handle immovably fixed to a screw, *e*, which is turned in either direction by said handle *c*. *d* and *f* (see Fig. 3) are projections or shields for the purpose of holding the screw *e* in place in the portion *a* of the chin-rest. The lower part, *b*, of the rest runs upon the thread of the screw *e*.

In using our chin-rest, it is first placed upon the instrument, as in Fig. 1, and then tightened by turning the handle to the left, thus bringing the parts *a* and *b* together against the upper and lower parts of the violin. To remove the rest, the handle *c* is turned toward the right.

It will readily be understood that the application of a screw to the parts *a* and *b* has many advantages over a spring, as a screw allows of a ready adjustment of the rest to instruments of different thicknesses, cannot be loosened without the intention of so doing, is durable, easily operated, and not apt to get out of repair.

Having thus fully described our invention, we do not claim the parts *a b* in themselves as new; but

What we claim, and desire to secure by Letters Patent, is—

1. In a violin chin-rest the combination, with the parts or clamps *a* and *b*, of a screw or screws for moving the said parts toward and from each other, and rendering the said chin-rest adjustable to instruments of different thicknesses, substantially as specified.

2. The combination and arrangement of the screw *e*, with the handle *c* attached, combined with the holds or shields *d* and *f*, for the purpose and in the manner hereinbefore set forth.

ASA W. WHITE.
JOHN J. WATSON.

Witnesses:
HENRY W. WILLIAMS,
E. H. OBER.